United States Patent
Wheeler et al.

(10) Patent No.: US 6,387,555 B1
(45) Date of Patent: May 14, 2002

(54) SELECTIVE OXIDIZER IN CELL STACK MANIFOLD

(75) Inventors: Douglas J. Wheeler, Tolland; Thomas J. Corrigan, Coventry; Leonard J. Bonville, Marlborough; Roger R. Lesieur, Enfield, all of CT (US); Derek W. Hildreth, Sunderland, MA (US); Carl A. Reiser, Stonington, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 0 days.

(21) Appl. No.: 09/510,697

(22) Filed: Feb. 22, 2000

(51) Int. Cl.$^7$ ................................................ H01M 8/04
(52) U.S. Cl. .......................................... 429/17; 429/19
(58) Field of Search ............................. 429/26, 31, 35, 429/17, 19, 38

(56) References Cited

U.S. PATENT DOCUMENTS

| | | | | |
|---|---|---|---|---|
| 4,004,947 A | * | 1/1977 | Bloomfield | 429/17 |
| 5,330,727 A | * | 7/1994 | Trocciola et al. | 422/177 |
| 5,482,680 A | * | 1/1996 | Wilkinson et al. | 422/177 |
| 5,733,347 A | | 3/1998 | Lesieur | 48/61 |
| 5,750,076 A | * | 5/1998 | Buswell et al. | 422/115 |
| 6,156,084 A | * | 12/2000 | Bonville, Jr. et al. | 48/61 |
| 6,187,465 B1 | * | 2/2001 | Galloway | 429/17 |

* cited by examiner

Primary Examiner—Gabrielle Brouillette
Assistant Examiner—M. Wills
(74) Attorney, Agent, or Firm—Barlow, Josephs & Holmes, Ltd.

(57) ABSTRACT

An integrated fuel cell stack assembly (26) and selective oxidizer bed assembly (200) is provided. The fuel cell stack assembly (26) also includes a number of fuel cells. A fuel inlet manifold (22) and fuel inlet plenum to cell stack (38) manifold are arranged in fluid communication with the fuel stack assembly (26) for supplying to and exhausting from, respectively, the fuel supply in the fuel cells in the fuel stack assembly (26). The bed resides in said fuel inlet manifold. The bed includes a selective oxidation catalyst with a heat exchange fluid conduit routed therethrough. Oxygen-containing gas is supplied into the bed via the input plenum. The temperature of the internal selective oxidizer bed is controlled by the fluid conduit in the bed to reduce carbon monoxide in the fuel.

16 Claims, 6 Drawing Sheets

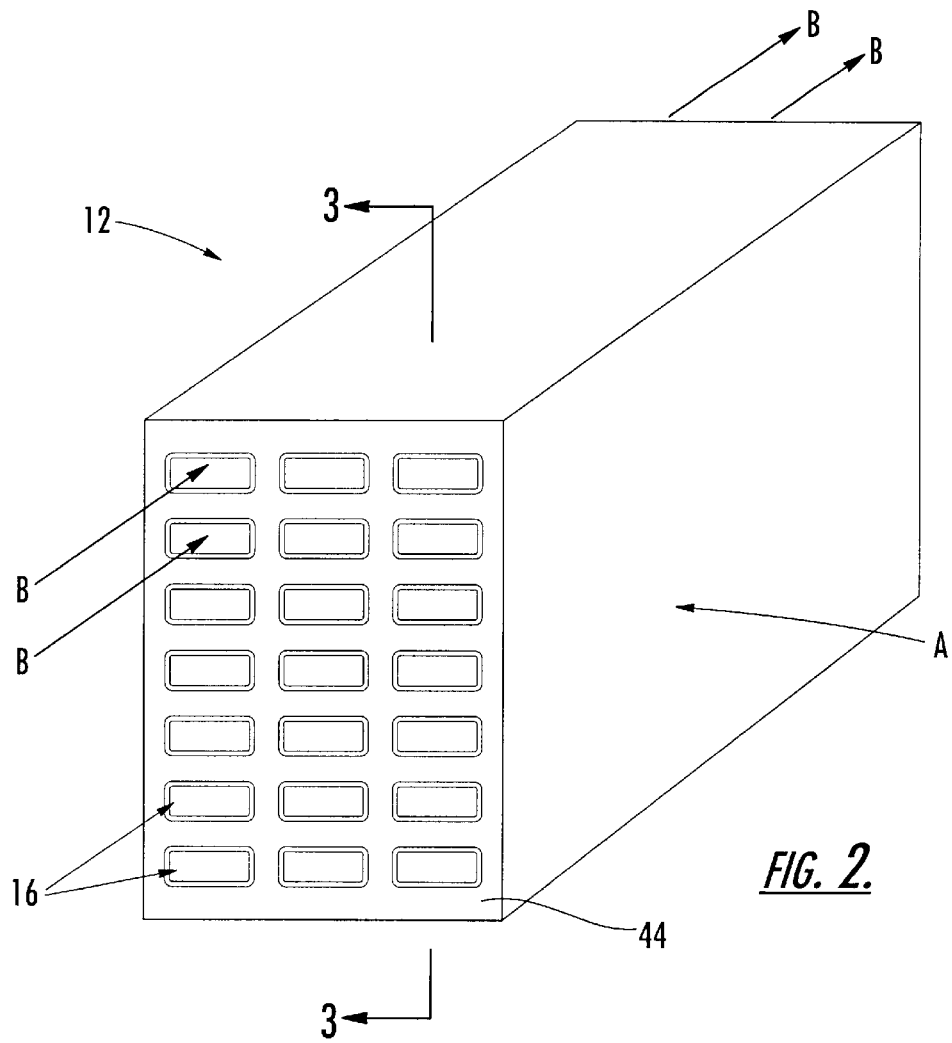
FIG. 2.
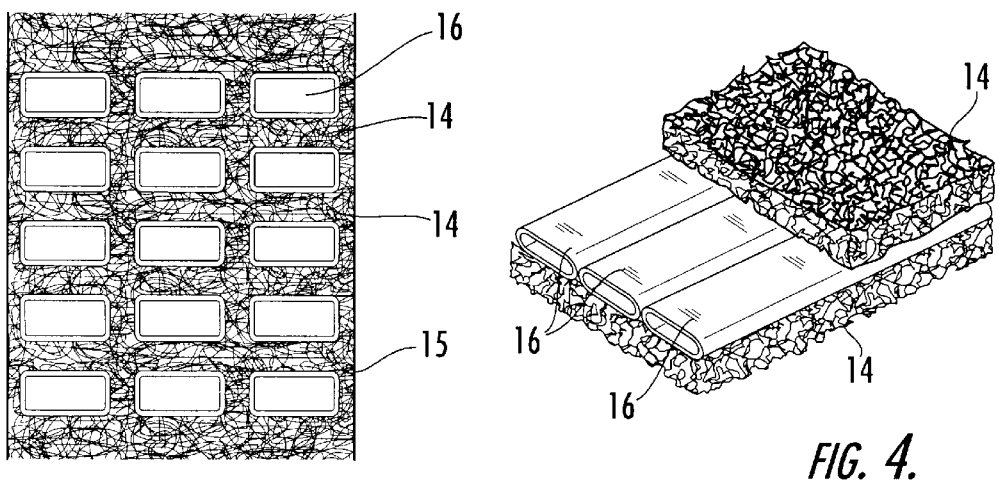
FIG. 3.
FIG. 4.

SELECTIVE OXIDIZER IN CELL STACK MANIFOLD

This is a related application to commonly owned applications Ser. No. 09/346,888 filed Jul. 2, 1999 now U.S. Pat. No. 6,309,768; Ser. No. 09/265,139 filed Mar. 8, 1999; and Ser. No. 09/273,735 filed Mar. 22, 1999, now U.S. Pat. No. 6,284,206.

TECHNICAL FIELD

The present invention relates to a method and apparatus for selectively oxidizing the carbon monoxide present in a mixture of gases, including hydrogen, carbon dioxide and water vapor. In particular, the present invention relates to an assembly and method for counteracting the poisoning effects of the selective oxidation catalyst active sites by carbon monoxide; to maintain the concentration of carbon monoxide in the outlet gas stream well below 10 parts per million ("ppm") and to periodically regenerate the selective oxidizer bed. Further, the present invention relates to an assembly for reducing fuel cell performance decay and polishing the fuel stream to eliminate residual traces of deleterious carbon monoxide.

BACKGROUND ART

Electrochemical fuel cells convert fuel and oxidant to electricity and reaction product. In electrochemical fuel cells employing hydrogen as the fuel and oxygen as the oxidant, the reaction product is water. Recently, efforts have been devoted to identifying ways to operate electrochemical fuel cells using other than pure hydrogen as the fuel. Fuel cell systems operating on pure hydrogen are generally disadvantageous because of the expense of producing and storing pure hydrogen gas. In addition, the use of liquid fuels is preferable to pure, stored hydrogen in some mobile and vehicular applications of electrochemical fuel cells.

Recent efforts have focused on the use of hydrogen obtained from the chemical conversion of hydrocarbon and oxygenated fuels into hydrogen rich gas. However, to be useful for proton exchange membrane fuel cells and other similar hydrogen-based chemical applications, these fuels must be efficiently converted to hydrogen with a minimal amount of undesirable chemical by-products, such as carbon monoxide (CO). The presence of such CO by-product greatly decreases the performance of the fuel cell and has a particularly detrimental effect on the anode of the fuel cell.

Conversion of hydrocarbons and oxygenated fuels such as methanol to hydrogen is generally accomplished through steam reformation in a reactor commonly referred to as a catalytic reformer. The steam reformation of methanol is represented by the following chemical equation:

$$CH_3OH + H_2O + heat \rightarrow 3H_2 + CO_2 \qquad (1)$$

Due to competing reactions and thermodynamic limitations, the initial gaseous mixture produced by steam reformation of methanol typically contains from about 0.5% to about 20% by volume of carbon monoxide and about 65% to about 75% hydrogen, along with about 10% to about 25% carbon dioxide on a dry basis (in addition, water vapor can be present in the gas stream). The initial gas mixture produced by the steam reformer can be further processed by a shift reactor (sometimes called a shift converter) to increase the hydrogen content and to reduce the carbon monoxide content to about 0.2% to about 2%. The catalyzed reaction occurring in the shift converter is represented by the following chemical equation:

$$CO + H_2O \rightarrow CO_2 + H_2 \qquad (2)$$

Even after a combination of steam reformer/shift converter processing, the product gas mixture will have minor amounts of carbon monoxide and various hydrocarbon species, each present at about 1% or less of the total product mixture. A variety of conventional treatment processes may be employed to remove many of the hydrocarbon impurities generated during the steam reformer/shift converter process. However, such conventional treatment methods are generally incapable of reducing the carbon monoxide content of the gases much below 0.2%. Although this fuel processing was described for methanol as the fuel it is well known that other gaseous or liquid fuels, such as methane or gasoline, may be reformed to a hydrogen rich gas. Likewise alternatives to steam reforming, such as autothermal reforming, are also well known.

In low temperature, solid polymer proton exchange membrane fuel cell applications, which typically have an operating temperature of less than 100° C., the presence of carbon monoxide in the inlet hydrogen stream, even at the 0.1% to 1% level, is generally unacceptable. In solid polymer electrolyte fuel cells, the electrochemical reaction is typically catalyzed by an active catalytic material comprising a noble metal, or noble metal alloys, such as platinum or platinum-ruthenium. In addition, other metals may be employed as a catalyst material, such as palladium or rhodium. Further, the noble metal may be promoted with metal oxides, such as iron oxide, cerium oxide, manganese dioxide, vanadium pentoxide, tungsten oxide, and the like.

However, carbon monoxide adsorbs preferentially to the surface of platinum on the anode, effectively poisoning the catalyst and significantly reducing the rate and efficiency of the desired electrochemical reaction. Thus, the amount of carbon monoxide in the hydrogen-containing gas mixture produced by a steam reformer/shift converter process for use in electrochemical fuel cells should be minimized, preferably to an amount significantly lower than the approximately 1% achieved using conventional steam reformation and shift conversion methods. The present selective oxidizing method and apparatus reduce the amount of carbon monoxide in a hydrogen-containing gas stream to a level suitable for use in low temperature electrochemical fuel cells, generally significantly less than 100 ppm.

In known selective oxidizing methods, it is believed that at least three competing reactions occur, which are represented by the following chemical equations:

1. The desired oxidation of carbon monoxide to carbon dioxide:

$$CO + \tfrac{1}{2}O_2 \rightarrow CO_2 \qquad (3)$$

2. The undesired oxidation of hydrogen to water:

$$H_2 + \tfrac{1}{2}O_2 \rightarrow H_2O \qquad (4)$$

3. The undesired reverse water gas shift reaction:

$$CO_2 + H_2 \rightarrow H_2O + CO \qquad (5)$$

One of the most common selective oxidizer designs uses an adiabatic catalyst bed to react the carbon monoxide with oxygen supplied by an oxygen-containing gas (e.g., air). Catalyst loading, bed space velocity, and air flow are selected to control the temperatures in the bed so that bed size is minimized while the selectivity of the reaction to consume carbon monoxide is maximized.

To address these problems, prior art systems have been developed where at least two selective oxidizers are arranged in series with one another and operating at two distinct temperatures.

However, the foregoing prior art systems, such as U.S. Pat. No. 5,482,680, are not well suited for automobile applications where size and weight are of paramount concern. The reduction of power plant volume is of paramount concern. As a result, prior art systems with separate multiple selective oxidizer beds in series suffer from the disadvantages of increased weight, volume, complexity and the associated cost. The use of separate selective oxidizers adds weight, increases power plant volume and adds to power plant connective piping.

In addition, these systems operate exothermally thus requiring a separate heat exchanger to cool the stream prior to entering the fuel cell.

In view of the foregoing, an improved catalyst and selective oxidizer bed regeneration process is desired that employ systems that are much lighter in weight than prior art systems and less complex in design and less expensive to manufacture, operate and maintain. Further, there is a desire for a process that employs only a single selective oxidizer bed in series with the fuel cell. There is also a desire for such a process to permit the selective oxidizer to operate at a relatively low temperature to obviate the need for a separate heat exchanger to cool the oxidized gas prior to the fuel entering the cell. It is also desirable that a suitable process in a automobile environment be provided that is less expensive, more efficient and less complex to manufacture and operate.

DISCLOSURE OF THE INVENTION

The present invention preserves the advantages of prior art assemblies and processes as well as reducing the overall carbon monoxide level in a gaseous stream. In addition, it provides new advantages not found in currently available assemblies and processes, and overcomes many disadvantages of such currently known assemblies and processes.

An integrated fuel cell stack and selective oxidizer bed assembly is provided which includes a fuel cell stack assembly. The fuel cell stack assembly also includes a number of fuel cells. A fuel inlet manifold and fuel exhaust manifold are arranged in fluid communication with the fuel stack assembly for supplying to and exhausting from, respectively, the fuel supply in the fuel cells in the fuel stack assembly. The bed resides in said fuel inlet manifold. The bed includes catalyzed open cell foam with a heat exchange fluid conduit routed therethrough. Oxygen-containing gas is supplied into the bed via the input port. The temperature of the primary selective oxidizer bed is controlled by the fluid conduit in the bed in order to best reduce the carbon monoxide in the fuel.

In accordance with the present invention, the selective oxidizer is incorporated directly into the fuel inlet manifold. A primary advantage of positioning the selective oxidizer in the fuel inlet manifold is the reduction of the overall volume and weight of the entire power plant. The inventive process also includes the embedding cooling coils within a selective oxidizer bed of an open cell foam and introducing coolant through relatively flattened cooling coils to effectively control the temperature of the selective oxidizer bed. The coolest coils are located closest to a fuel outlet plenum. The temperature of a selective oxidizer bed is controlled by adjusting the temperature and/or flow rate of the coolant through the cooling coils or tubes during normal operation and regeneration.

Accordingly, it is a general object of the present invention to avoid the disadvantages of the prior art.

More particularly, it is an object of the present invention to provide an apparatus and method of selectively removing carbon monoxide from a gaseous medium by oxidation.

Another object of the present invention is to reduce the weight and volume of a fuel cell power plant.

A further object of the present invention is to polish the fuel stream to minimize the concentration of carbon monoxide.

Yet another object of the present invention is to reduce the amount of power plant connective piping.

A concomitant object of the present invention is to design the apparatus of the above type in such a manner as to be relatively simple in construction, inexpensive to manufacture, easy to use, and yet reliable in operation.

BRIEF DESCRIPTION OF THE DRAWINGS

The novel features which are characteristic of the present invention are set forth in the appended claims. However, the inventions preferred embodiments, together with further objects and attendant advantages, will be best understood by reference to the following detailed description taken in connection with the accompanying drawings in which:

FIG. 2 is a fragmented perspective view of a sub-component employed in the assembly of FIG. 1;

FIG. 3 is a perspective view of an assembled selective oxidizer employing the sub-component shown in FIG. 2;

FIG. 4 is a cross sectional view through the line 4—4 of FIG. 3;

MODES FOR CARRYING OUT THE INVENTION

Figure 1:
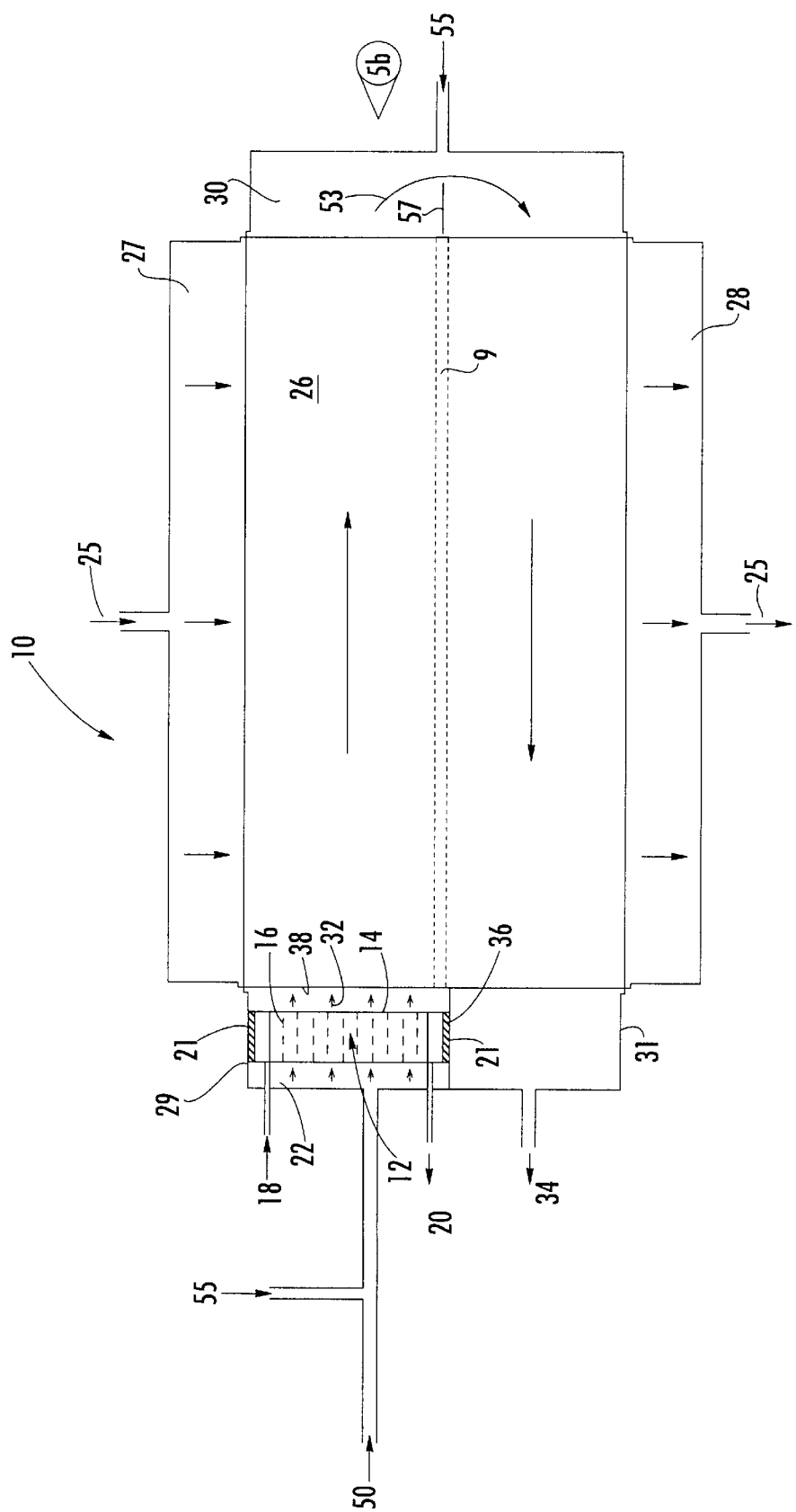
FIG. 1 is a simplified plan illustration of a fuel cell stack manifold and integrated selective oxidizer assembly in accordance with the preferred embodiment of the present invention.

The present invention relates to treating the fuel supplied to a fuel cell or group of fuel cells known as a fuel cell stack. The general principles of construction and operation of the fuel cells within a fuel cell stack are so well known as not to require detailed explanation herein. Suffice it to say that a catalytic electrochemical reaction takes place in the fuel cell, resulting in combination of hydrogen with oxygen into product water, and in generation of a useful output, that is, electric power.

The fuel cell electrochemical reaction requires the presence of at least one catalyst, typically a carbon-supported platinum or platinum alloy. Catalysts of this kind are known to have a pronounced affinity for carbon monoxide, with the deleterious effect that any carbon monoxide carried to the anode side of a fuel cell in the hydrogen rich fuel stream admitted through the fuel supply conduit will "poison" the anode catalyst or a portion thereof, that is, render it less effective for promoting the desired electrochemical reaction by attaching itself to the catalyst and thus denying the hydrogen access thereto. The extent of such anode catalyst poisoning is determined in part by the concentration (or partial pressure) of carbon monoxide present in the gaseous fuel and the operating temperature of the fuel cell.

Obviously, this problem does not exist when pure, or substantially pure, hydrogen is being used as the fuel. However, such pure hydrogen is rather expensive and difficult to handle and deliver, so that a search is on in the fuel cell field for ways to utilize alternative fuels, such as methane, natural gas, or other hydrocarbon fuels, such as gasoline. Yet, such alternative fuels cannot be efficiently used in the fuel cell as such; rather, they or their components have to be converted into a hydrogen rich stream to be used as the fuel in the fuel cell. Such conversion usually takes place, in accordance with well known principles, in a steam reformer and a shift converter together constituting the fuel processing system. Unfortunately, experience has shown that it is not possible to achieve complete conversion of the reformer generated carbon monoxide, contained in the incoming fuel, to carbon dioxide, which means that the gaseous fuel leaving the fuel processing system through a discharge conduit contains a relatively high percentage, such as 1%, or 10,000 parts per million (ppm), of carbon monoxide.

As mentioned before, the anode catalyst of the fuel cell cannot tolerate carbon monoxide without suffering performance loss or effectiveness or other damage. Obviously, the extent of deterioration would be extremely high if the hydrogen rich gas exiting the fuel processing system were supplied directly to the anode electrode. Therefore, it is crucial to provide for removal of as much of the carbon monoxide from such hydrogen rich gas as possible to assure that the fuel cell will remain operational over a reasonable amount of time. Ideally, the hydrogen rich gas would be free of all carbon monoxide before being supplied to the anode side of the fuel cell, but that is impossible to achieve, at least with the current state of technology. This being so, it is important to reduce the carbon monoxide concentration in the gaseous fuel supplied to the anode side to below the minimum acceptable level.

Referring now to FIG. 1, the preferred embodiment of the assembly 10 of the present invention is viewed in plan form and is shown to include a fuel cell stack assembly 26. The fuel cell stack assembly 26 is equipped with an oxidant inlet manifold 27 which is attached to one side of the fuel cell stack assembly 26 in a gas-tight manner by a combination of non-illustrated fasteners and seals. The oxidant inlet manifold 27 accepts an incoming oxidant stream 25 from a non-illustrated oxidant supply and directs the oxidant stream 25 through oxidant inlet channels in the cathode field flow plates (not shown) for each fuel cell in the fuel cell stack assembly 26. Spent oxidant number is subsequently exhausted from the fuel cell stack assembly 26 through an oxidant exhaust manifold 28, also attached to an opposing side of the fuel cell stack assembly 26 in a gas-tight manner by a combination of non-illustrated fasteners and seals.

The fuel cell stack assembly 26 is further equipped with a fuel inlet manifold 29 which is attached to one side of the fuel cell stack assembly 26 in a gas-tight manner by a combination of non-illustrated fasteners and seals. The fuel outlet plenum 38 accepts a fuel stream 32 consisting of reformed fuel which has been treated by an integrated selective oxidizer, generally referenced as 12, which will be described in detail below.

The fuel inlet manifold 29, akin to the oxidant inlet and exhaust manifolds 27 and 28, preferably runs the length of the fuel cell stack assembly 26, but only covers approximately half of each fuel cell. The fuel stream 32 is directed in a first pass through approximately one half of the fuel channel in the anode flow plate of each fuel cell in the fuel cell stack assembly 26. A fuel turn manifold 30 directs the fuel back through the fuel cell stack assembly 26.

Fuel 34 exhaust which has finished circulating through the fuel cell stack assembly 26 is subsequently exhausted from the fuel cell stack assembly 26 through a fuel exhaust manifold 31, also attached to an opposing side of the fuel cell stack assembly 26 in a gas-tight manner by a combination of non-illustrated fasteners and seals. The fuel inlet and exhaust manifolds, 29 and 31 respectively, normally form an integral unit separated by a flow divider 36 for ensuring that spent fuel 34 arriving at the fuel exhaust manifold 31 does not mix with the hydrogen-rich oxygen treated fuel stream 32 being supplied to the fuel inlet manifold 29.

Still referring to FIG. 1, in assembly 10 the selective oxidizer 12 is integrated directly into the fuel inlet manifold 29 for treating the fuel prior to introduction into the fuel cell stack assembly 26. The selective oxidizer is maintained in gas-tight relationship with the fuel inlet manifold by seals 21. The selective oxidizer 12 is provided with a catalyst bed 14 with conduit 16 therein for directing coolant throughout the selective oxidizer bed 14. Details of the construction of the selective oxidizer 12 component will be described in detail below. A coolant supply conduit 18 directs coolant from a coolant source (not shown) into the coolant conduit 16 within the selective oxidizer bed 14. A coolant outlet port 20 is also provided to remove coolant from the selective oxidizer 12. Also, a fuel supply line 50 is provided which directs fuel to a fuel inlet plenum 22 upstream of the selective oxidizer bed 14 along with a conduit 55 for injecting oxidant containing gas into the fuel stream. A fuel outlet plenum 38, downstream of the selective oxidizer bed 14, now provides a treated and low-CO fuel stream to the fuel cell stack assembly 26.

Turning now to FIGS. 2–4, the preferred construction of the selective oxidizer 12 is shown. FIG. 2 illustrates the formation of the catalyzed bed components and the heat exchanger components from the foam monolith material. Process gas enters the assemblage 12 via the catalyst bed 44 as indicated by the arrow A. The process gas with a measured amount of injected air, not shown, flows through the catalyst bed where the carbon monoxide is oxidized. After exiting the catalyst bed 44, the treated fuel stream enters the fuel outlet plenum 38 shown in FIG. 1. The treated fuel stream 32 can be used to feed a single, or separate fuel cell stack assemblies (not shown). The selective oxidizer assemblage 12 also contains heat exchanger conduits 16 for removing heat of reaction produced. The coolant fluid enters the assemblage 12 through coolant conduits 16 and flows in the direction indicated by arrow referenced as B. As can be understood, other flow patterns and conduit configurations may be employed and the coolant may be redirected through the conduits 16 as desired. The coolant flow through the assemblage 12 is directed by coolant manifolds, not shown, such that the coldest coolant enters the assemblage 12 at the outlet plenum 38 side of the assemblage 12 and exits at the inlet plenum 22 shown in FIG. 1. The coolant flow through the assemblage 12 is generally counter current to the process stream flow.

While the foregoing selective oxidizer is preferably construction in accordance with FIG. 2 above, other constructions may be employed to accommodate the application at hand.

FIGS. 3 and 4 illustrate the construction of the "building block" components that are employed to construct the selective oxidizer 12 of the present invention that is integrated directly into the fuel inlet manifold 29. The coolant flow conduit 16 is preferably a flattened heat exchanger element with integral cooling passages. The open cell monolith foam components 14 are sandwiched about and brazed to coolant flow conduits 16 and disposed within housing 15, as shown in FIG. 3 which is a cross-sectional view through the line 3—3 of FIG. 2. FIG. 4 shows a perspective of the sub-assembly, with foam 14 partially cut away for illustration purposes. The finished sub-assemblies are then laid up and brazed together so as to form the coherent core assemblage 12 shown in FIG. 4. The brazed sub-assemblies, which are used to form the heat exchanger sections, are not wash coated or catalyzed prior to brazing. Each of the brazed sub-assemblies, which are used to form the catalyst beds, are subsequentially wash coated with alumina or silicon-alumina and the resultant porous wash coated surfaces are catalyzed.

The metal components of the selective oxidizer assemblage are preferably formed from aluminum, stainless steel or a steel based alloy containing aluminum. The planar walls and the gas flow monoliths are assembled by welding or brazing the assemblage. The assemblage is treated to allow the wash coat to adhere during thermal cycles, for example, by heat treating to generate a surface coating of aluminum oxide on all of the exposed surfaces in the catalyst beds. A wash coating primer is applied to the surfaces to be catalyzed. The catalyst coating is then applied to the wash coated surfaces of the catalyst bed passages by well known processes.

In general, the assembly 10, shown in FIG. 1, provides a selective oxidizer 12 integrated directly into the fuel inlet manifold 29 for supply of treated fuel to the fuel cell stack assembly 26. At this location, the selective oxidizer 12 reacts carbon monoxide impurities in the hydrogen rich fuel feed stream to which a small quantity of oxygen containing gas has been added via conduit 55. This reaction, as described above, of the carbon monoxide and air yields carbon dioxide and minimizes the carbon monoxide catalyst poisoning. The integration of the selective oxidizer 12 directly within the fuel inlet manifold 29, as opposed to the prior art process of selectively oxidizing the carbon monoxide in external reactors as shown in commonly owned U.S. Pat. No. 5,330,727, results in a significant reduction in the volume of the fuel cell power plant.

Figure 5:
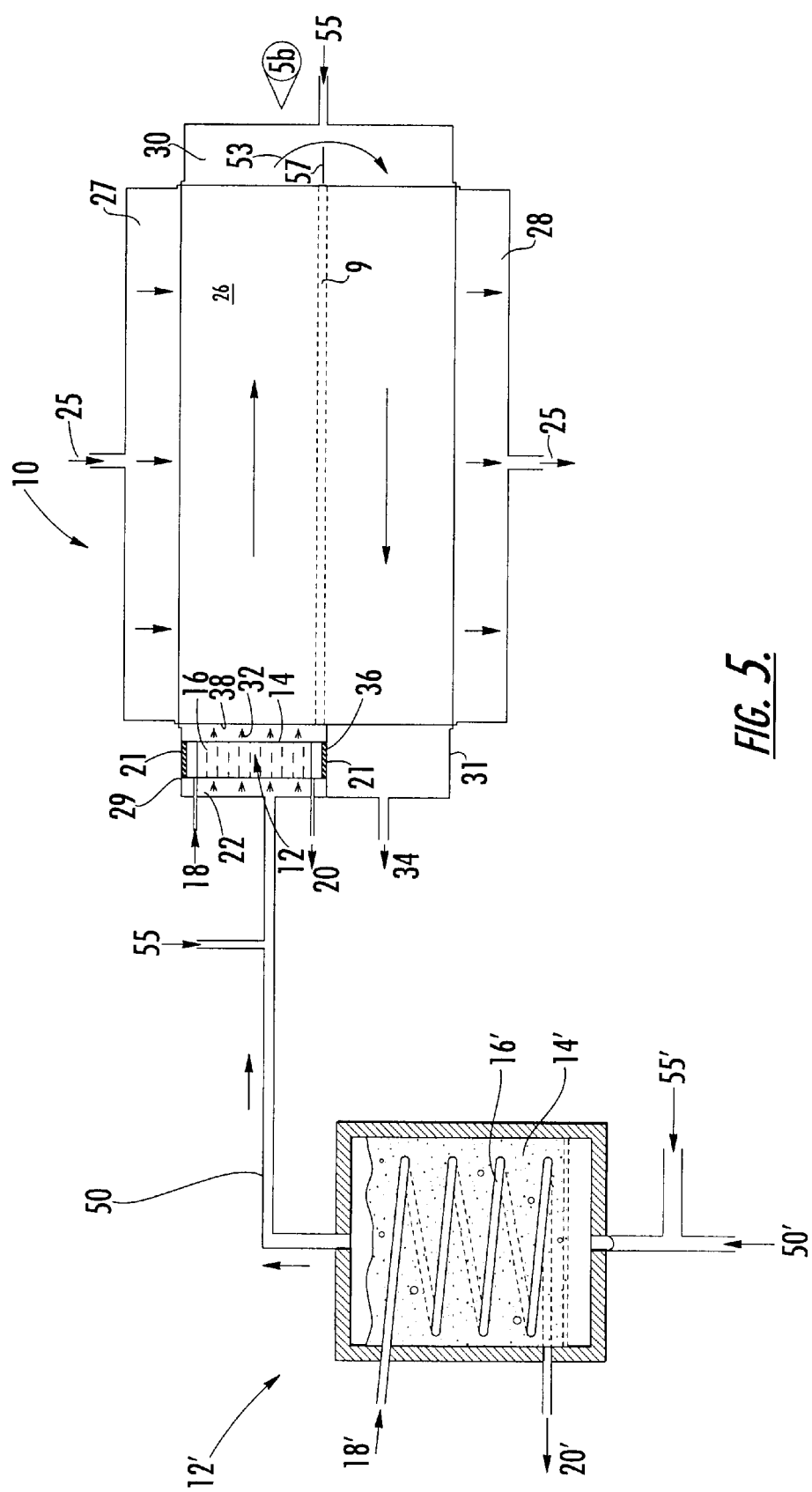
FIG. 5 is a simplified plan illustration of a fuel cell stack manifold and integrated selective oxidizer assembly in accordance with an alternative embodiment of the present invention which includes one internal selective oxidizer and one external selective oxidizer.

Turning now to FIG. 5, an alternative embodiment of the present invention is shown. The entire assembly of the preferred embodiment, shown in FIG. 1, is included in the alternative embodiment shown in FIG. 5. In addition, an external second selective oxidizer 12' is provided to serve as a first selective oxidizer stage. In similar fashion to the internal selective oxidizer, an external selective oxidizer 12' is provided with a selective oxidizer bed 14'. A fuel inlet line 50' provides fuel to bed 14'. Oxygen-containing gas, such as air, is introduced into the fuel stream via conduit 55'. Further, coolant is introduced into the selective oxidizer bed 14' via a coolant inlet conduit 18' and routed through conduit 16' and exits the bed 14' via a coolant outlet conduit 20'. As discussed above in connection with the preferred embodiment above, coolant circulates through tubes 16' embedded within bed 14'. In this embodiment, hydrogen-rich fuel is treated to remove carbon monoxide in two distinct stages. Treated fuel exits external selective oxidizer 12' to supply initially treated fuel to fuel line 50. The second stage, integrated directly within the fuel inlet manifold 29, provides a final "polishing" treatment for the fuel received from the first selective oxidizer 12'.

Figure 6:
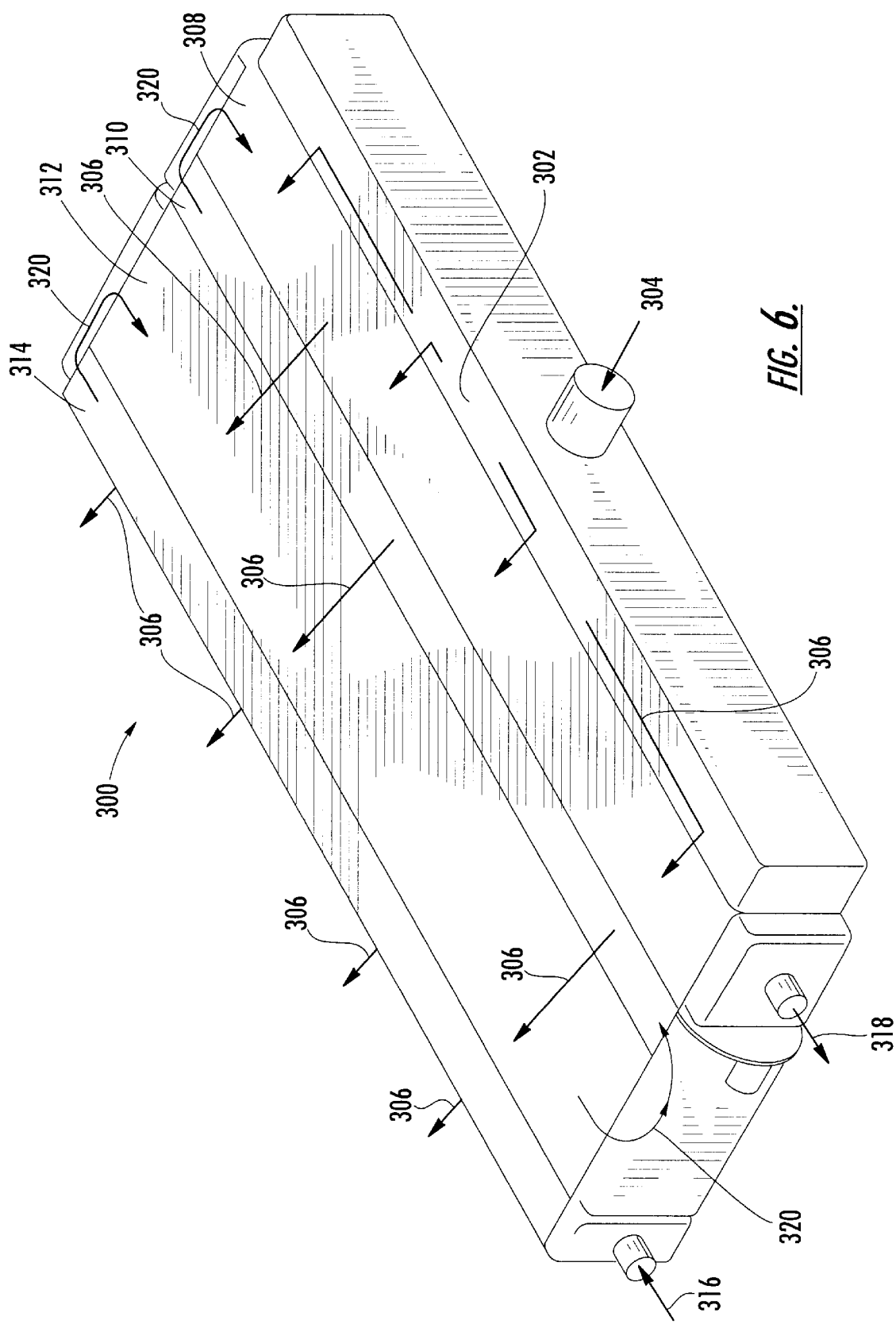
FIG. 6 is a perspective view of an alternative embodiment of the present invention with a two-stage selective oxidizer incorporated into the fuel inlet manifold.

FIG. 6 further shows an alternative to the two-stage selective oxidizer of FIG. 5 where both stages are incorporated into the fuel inlet manifold. This assembly 300 includes a fuel distribution plenum 302 which receives fuel, from a fuel source, via fuel inlet 304. Fuel, indicated by arrows 306 passes through, in sequence, first selective oxidizer 308, first heat exchanger 310, second selective oxidizer 312 and second heat exchanger 314. Coolant is introduced through coolant inlet 316 and passes through the assembly 300, as indicated by arrows 320, to exit at coolant output 318.

Figure 7:
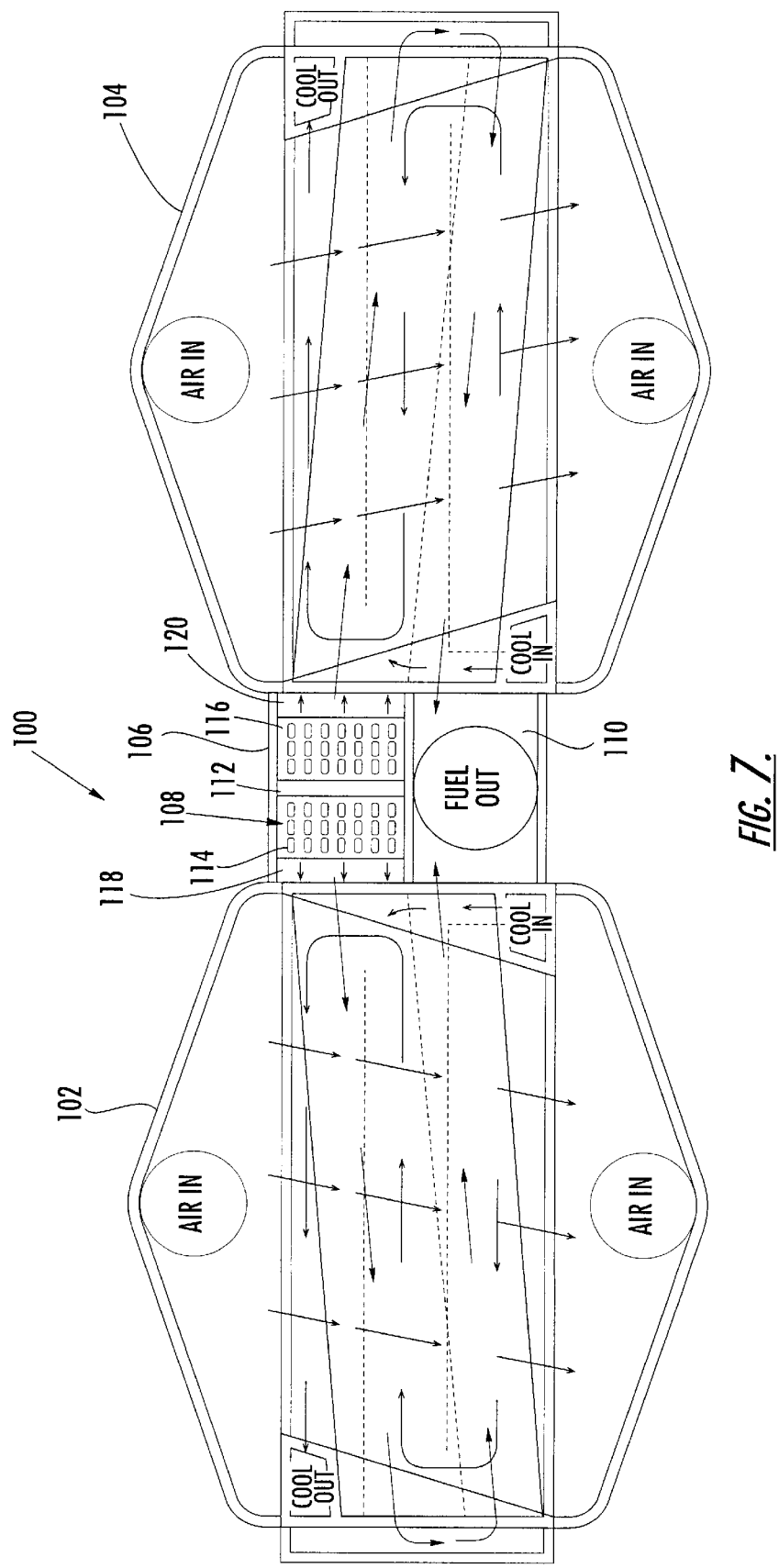
FIG. 7 is a cross-sectional view of a fuel cell stack manifold and integrated selective oxidizer assembly in accordance with another alternative embodiment of the present invention which includes one internal selective oxidizer for two fuel cell stack assemblies.

Still further, another embodiment 100 of the present invention is shown in FIG. 7. In this embodiment, two separate fuel cell stack assemblies 102 and 104 are provided with a single fuel inlet manifold 106 disposed therebetween. A single selective oxidizer 108, of the type shown in FIG. 1, is integrated directly into the anode fuel inlet manifold 106. Fuel enters fuel inlet plenum 112 which simultaneously delivers fuel to both catalyst beds 114 and 116. Treated fuel is supplied to cell stack assembly 102 from catalyst bed 114 via outlet plenum 118. Treated fuel is supplied to cell stack assembly 104 from catalyst bed 116 via outlet plenum 120. As a result, the integrated selective oxidizer 108 of the present invention simultaneously directs treated fuel to both of fuel cell stack assemblies 102 and 104 positioned on opposing sides of the fuel inlet plenum 112. Spent fuel exits from a single fuel exhaust manifold 110 positioned below the fuel inlet manifold 106.

It can be understood that various configurations are envisioned where a single selective oxidizer 12 can polish fuel to be supplied to two separate fuel cell stack assemblies. In view of the alternative embodiment of FIG. 5, an initial external selective oxidizer 12', may also be employed to provide a first carbon monoxide removal stage. Likewise in view of the alternative embodiment of FIG. 6, a two-stage selective oxidizer, may also be employed to provide a treated fuel stream to multiple fuel cell stack assemblies.

Figure 8:
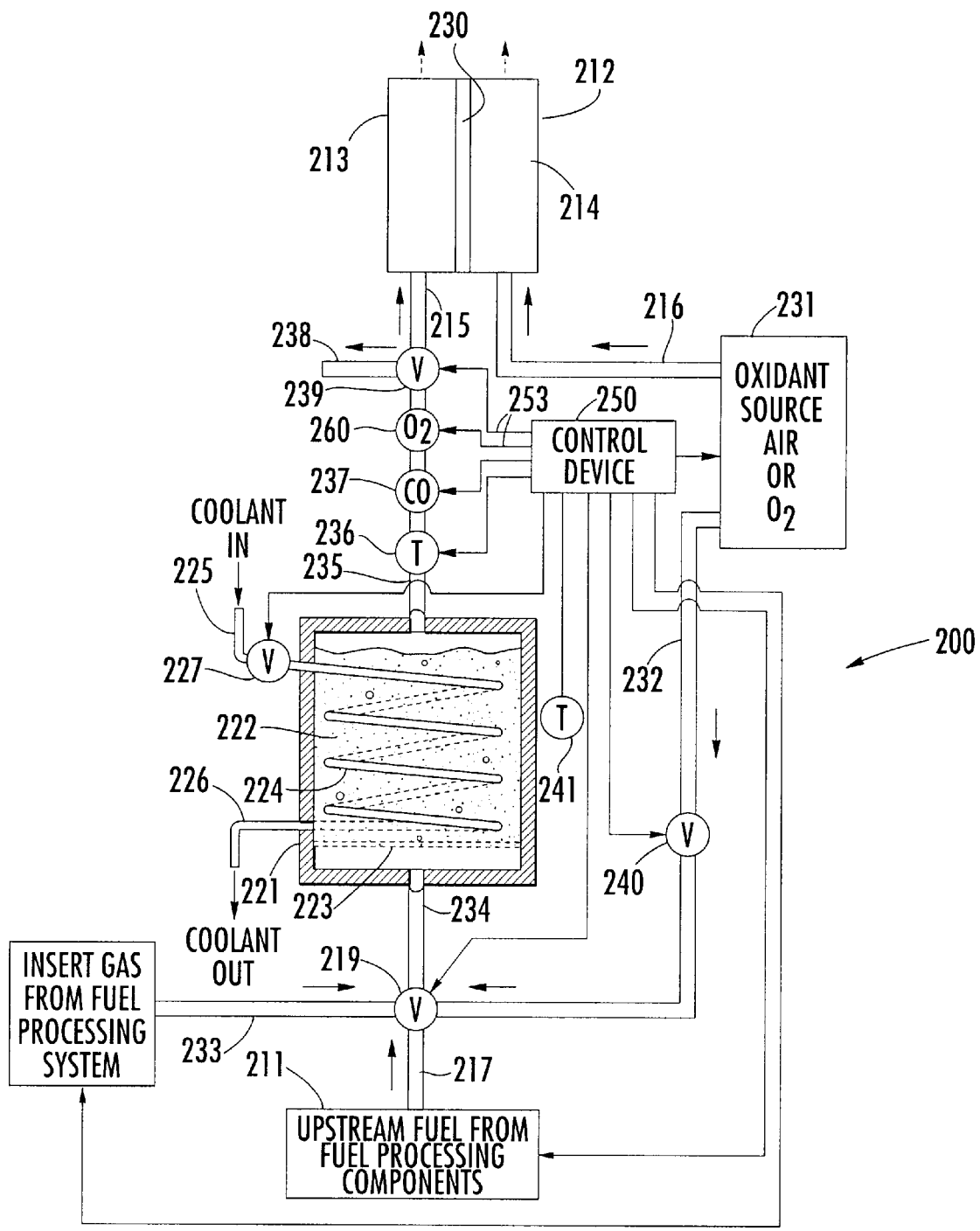
FIG. 8 is a simplified elevational view, partly in cross-section and partly in block diagram form, of a representational selective oxidizer apparatus illustrating the preferred operating conditions and process for the assembly of the present invention as used for treating hydrogen rich fuel for a fuel cell.

Referring now to FIG. 8, the operation conditions of the integrated selective oxidizer 12 in fuel inlet manifold assembly, shown in FIG. 1, is shown in representative form. Block diagrams are shown along with a representational selective oxidizer for the purposes of illustrating the operating conditions of the present invention. It should be understood that the physical structure and configuration of the selective oxidizer and its embodiments is that shown in FIGS. 1–7.

It may be seen that the reference numeral 200 has been used therein to identify a selective carbon monoxide removal apparatus constructed in accordance with the present invention. As illustrated, the apparatus 200 is to be used for reducing to a minimum level the concentration of carbon monoxide in a hydrogen rich fuel stream fed from upstream fuel processing components. While the fuel cell 212 has been illustrated, for the sake of simplicity, as being constituted by a single fuel cell having an anode side 213, cathode side 214, and electrolyte 230 therebetween, it is to be understood that the fuel cell 212 can and, as is well known, usually does, contain a multitude of such individual fuel cells arranged in groups, stacks and similar assemblies. The electrolyte may be aqueous or, preferably, a proton exchange membrane (PEM). Fuel cells that use a PEM typically operate at temperatures that are less than 100° C. The fuel cell 212 has the anode side 213 to which the treated gaseous fuel is fed through a fuel supply conduit 215, and the cathode side 214 to which a gaseous oxidant, such as oxygen or air, is admitted or supplied through an oxidant supply conduit 216.

As shown in FIG. 8, a selective oxidizer 200 is employed to reduce the carbon monoxide concentration in the hydrogen rich gas that is supplied to the fuel cell 212. The selective oxidizer 200 is supplied with the hydrogen rich gas emerging from the fuel processing system 211 through the discharge conduit 217. Selective oxidizer 200 includes an enclosed vessel or container 221 which bounds an internal chamber. A respective body or bed 222 of a catalyst capable of selectively oxidizing carbon monoxide in the presence of gaseous oxygen, such as the foam described in detail above, is contained in the internal chamber of the container 221, being shown to be supported on a perforated or otherwise gas-permeable support member 223 which facilitates the distribution of the gaseous fuel to all regions of the catalyst bed 222 and makes it as uniform as possible. The catalyst contained in the bed 222 is of the type known to be highly selective for carbon monoxide. Currently, it is preferred to use alumina supported platinum, by itself or in combination with other trace elements, for the selective catalyst of the catalyst bed 222.

Gaseous oxygen, the presence of which is needed for the performance of the selective oxidizing reaction in the catalyst bed 222, is supplied from oxygen or oxygen-carrying gas source 231 via conduit 232 to four way valve-mixer 219 for mixing with the gaseous fuel flowing in the conduit 217. Trim valve 240 is also preferably provided to precisely control the flow of oxidant via conduit 232. However, it is to be understood that such oxygen or oxygen-carrying gas could be introduced instead directly into the container 221 either only upstream of the catalyst bed 222 or additionally into the bed 222 itself.

At outlet gas conduit 235, temperature sensor 236 is provided in-line with the outlet gas flow from oxidizer 200 for monitoring the temperature of gas flowing through conduit 235. In addition, a carbon monoxide sensor 236 may also be provided in-line with outlet gas conduit 235 to monitor the carbon monoxide concentration in the gas flowing therethrough. Further, an oxygen sensor 260 may also be provided in-line with outlet gas conduit 235 to monitor the levels of oxygen present at the output of bed 222. The levels of oxygen in gas conduit 235 is indicative of the effectiveness of bed 222. As bed 222 becomes more and more poisoned over time, more oxygen will be present in conduit 235 because less oxygen-consuming reactions are taking place.

Still referring to FIG. 8, a optional exhaust outlet conduit 238 is provided from outlet gas conduit 235. This flow of the optional exhaust outlet conduit is controlled by valve 239. After sensors 236 and 237 and valve 239, fuel supply conduit provide the processed fuel to the anode side 213 of fuel cell 212.

A cooling coil 224 is shown to be embedded in the catalyst bed 222, being supplied with a coolant through a coolant supply conduit 225, with the coolant being discharged from the cooling coil 224 after passing therethrough via a respective spent coolant discharge conduit 226. As shown in FIGS. 2–3 above, the coils are preferably flattened tubes and the bed may be open cell catalyzed foam. The rate of flow of the fresh coolant into the respective cooling coil 224 is controlled by a respective coolant flow control valve 227. The coolant stream is typically of a temperature in the range of 160° F. to about 220° F.

The operation of the selective oxidizing apparatus 200 and particularly of the valve 227 is controlled by a controller 250 which may be of any known construction and usually includes a computer or a part of a computer, such as a microprocessor, that controls the operation of the fuel cell 212 and/or the fuel processing system 211, and appropriate software. The controller 250 is intended to control the apparatus 200 in such a manner that the selective oxidizing process, which is exothermic by nature, takes place in the catalyst bed 222 under well defined temperature conditions and sequence of processing that will be explained later. To be able to do this, the controller 250 is furnished with information from temperature sensor 236, carbon monoxide sensor 237, oxygen sensor 260 through connecting lines 253, concerning the temperatures of the gaseous fuel after it has left the selective oxidizer 200. Based on this information, the controller 250 then issues control commands that are furnished to the respective valves 240, 219, 227 and 239 through control lines 253 to thereby control the rate of flow of the coolant, oxidant, fuel and inert gas via their respective valves and conduits.

Control algorithms capable of accomplishing this purpose are of the well known type so that they need not be described in detail here. In accordance with the present invention, the cooling of, that is the removal of the exothermic oxidizing reaction heat from, the catalyst bed 222 is controlled via the valve 227 in such a manner that the temperatures existing in the catalyst bed 222 may be precisely controlled by the temperature and flow rate of coolant through coils 224. As is understood, the greater the flow rate of coolant or the lower the coolant inlet temperature, the lower the temperature of the catalyst bed will be. Similarly, the lower the flow rate of coolant or the higher the coolant inlet temperature, the higher the temperature of the bed will be. As a result, the temperature of the bed 222 may be easily controlled by the coolant flow rate and temperature.

The above apparatus, as shown in FIG. 8, is employed to feed an oxidant, such as oxygen or air, into a hydrogen rich fuel stream to, thereby, reduce the overall carbon monoxide concentration therein.

FIG. 8 illustrates a selective oxidizer arrangement which is used to carry out the process of the present invention. Preferably, the selective oxidizer 200 (corresponding to 12 in FIG. 1) resides directly within the fuel inlet manifold 29 as shown in FIG. 1. FIG. 7 illustrates a preferred embodiment of the present invention where a single selective oxidizer 200, with a single catalyst bed 222, is represented to show the operational details and related process. The physical construction of the assembly is shown in detail in FIG. 1. The preferred process provides for operating the single catalyst bed 222 at a relatively low temperature of approximately 180° F. This single low temperature catalyst bed 222, internally positioned within the fuel inlet manifold, is advantageous over the prior art multiple bed systems in that it has reduced weight, volume, complexity, cost, better efficiency. Since the single bed 222 operates at a low temperature, there is no need for a heat exchanger, as required in the prior art, to cool the fuel stream prior to entry into the PEM fuel cell. In view of the foregoing advantages, a process employing a single catalyst bed is ideally suited for automobile applications where weight, volume, complexity, cost and efficiency are of particular concern.

In addition, the single and multiple stage selective oxidizer assemblies of the present invention are carried out in accordance with processes and using operating conditions known in the art. For example, U.S. Pat. No. 5,482,680 discusses in detail well know prior art fuel processing techniques and processes. The present invention may be employed to carry out the known processes and operating conditions known in the prior art but in an improved compact integrated fuel cell stack and selective oxidizer assembly not known in the prior art.

The preferred selective oxidizer catalyst bed has been described as a catalyzed open cell monolith foam. One skilled in the art would recognize that the catalyst bed may alternatively consist of catalyzed pellets, a catalyzed wall of a plate fin heat exchanger or a catalyzed metal or ceramic screen or gauze without changing the invention. A catalyzed wall compact gas reformer is described in commonly owned U.S. Pat. No. 5,733,347.

The selective oxidizers have been described as actively cooled beds. Alternatively, the selective oxidizer may operate adiabatically with cooling external of the catalyst bed without changing the invention.

It would be appreciated by those skilled in the art that various changes and modifications can be made to the illustrated embodiments without departing from the spirit of the present invention. All such modifications and changes are intended to be covered by the appended claims.

What is claimed is:

1. A compact integrated fuel cell stack and selective oxidizer assembly, comprising:
    a fuel cell stack assembly comprising a plurality of fuel cells;
    a fuel inlet manifold adjacent to and in fluid communication with said fuel cell stack assembly for directing a fuel supply to said fuel cells in said fuel cell stack assembly;
    a fuel exhaust manifold arranged in fluid communication with said fuel cell stack assembly for exhausting said fuel supply from said fuel cells in said fuel cell stack assembly;
    an internal selective oxidizer bed, having an input plenum and an output plenum; said internal selective oxidizer bed residing in said fuel inlet manifold; said output plenum being connected to said fuel cell stack assembly; said internal selective oxidizer bed including a selective oxidation catalyst with a heat exchange fluid conduit routed therethrough; said heat exchange fluid conduit being in contact with said selective oxidation catalyst;
    a fuel source connected to said input plenum of said internal selective oxidizer bed; said fuel source providing fuel into said internal selective oxidizer bed;
    an oxidant source connected to said input plenum of said internal selective oxidizer bed; said oxidant source being capable of providing oxygen into said internal selective oxidizer bed via said input plenum; and
    temperature control means provided in said internal selective oxidizer bed and connected to said heat exchange fluid conduit bed for controlling the temperature of said internal selective oxidizer bed.

2. The compact integrated fuel cell stack and selective oxidizer assembly of claim 1, further comprising:
    an external selective oxidizer bed, having an input port and an output port, residing external to said fuel inlet manifold; said output port of said external selective oxidizer bed being connected to said input plenum of said internal selective oxidizer bed and upstream from said internal selective oxidizer bed; said external selective oxidizer bed including a selective oxidation catalyst with a heat exchange fluid conduit routed therethrough; said heat exchange fluid conduit in said external selective oxidizer bed being in contact with said selective oxidation catalyst in said external selective oxidizer bed.

3. The compact integrated fuel cell stack and selective oxidizer assembly of claim 1, wherein said selective oxidation catalyst is catalyzed open cell foam.

4. The compact integrated fuel cell stack and selective oxidizer assembly of claim 1, wherein said selective oxidation catalyst is catalyzed heat exchanger fins.

5. The compact integrated fuel cell stack and selective oxidizer assembly of claim 1, wherein said heat exchange conduit in said internal selective oxidizer bed includes a plurality of tubes; said tubes connected to a coolant source for receiving coolant therethrough; wherein said tubes that are positioned closest to said output plenum are the coldest tubes.

6. A compact integrated fuel cell stack and selective oxidizer assembly, comprising:
    a first fuel cell stack assembly comprising a plurality of fuel cells;
    a second fuel cell stack assembly comprising a plurality of fuel cells;
    a fuel inlet manifold adjacent to and in fluid communication with said first fuel cell stack assembly and adjacent to and in fluid communication with said second fuel cell stack assembly for directing a fuel supply to said fuel cells in said first fuel cell stack assembly and said fuel cells in said second fuel cell stack assembly;
    a fuel exhaust manifold arranged in fluid communication with said first fuel cell stack assembly and said second fuel cell stack assembly for exhausting said fuel supply from said fuel cells in said first fuel cell stack assembly and said fuel cells in said second fuel cell stack assembly;
    an internal selective oxidizer bed, having an input plenum and an output plenum; said internal selective oxidizer bed residing in said fuel inlet manifold; said output plenum being connected to said first fuel cell stack assembly and said second fuel cell stack assembly; said internal selective oxidizer bed including a selective oxidation catalyst with a heat exchange fluid conduit routed therethrough; said heat exchange fluid conduit being in contact with said selective oxidation catalyst;
    a fuel source connected to said input plenum of said internal selective oxidizer bed; said fuel source providing fuel into said internal selective oxidizer bed;
    an oxidant source connected to said input plenum of said internal selective oxidizer bed; said oxidant source being capable of providing oxygen into said internal selective oxidizer bed via said input plenum; and
    temperature control means provided in said internal selective oxidizer bed and connected to said heat exchange fluid conduit for controlling the temperature of said internal selective oxidizer bed.

7. The compact integrated fuel cell stack and selective oxidizer assembly of claim 6, further comprising:
    an external selective oxidizer bed, having an input plenum and an output plenum, residing external to said fuel inlet manifold; said output plenum of said external selective oxidizer bed being connected to said input plenum of said internal selective oxidizer bed and upstream from said internal selective oxidizer bed; said external selective oxidizer bed including a selective oxidation catalyst with a heat exchange fluid conduit routed therethrough; said heat exchange fluid conduit in said external selective oxidizer being in contact with said selective oxidation catalyst in said external selective oxidizer bed.

8. The compact integrated fuel cell stack and selective oxidizer assembly of claim 6, further comprising:

a first stage internal selective oxidizer bed, having an input plenum and an output plenum, residing within said fuel inlet manifold; said output plenum of said first stage selective oxidizer bed being connected to said input plenum of said internal selective oxidizer bed and upstream from said internal selective oxidizer bed; said first stage selective oxidizer bed including a selective oxidation catalyst with a heat exchange fluid conduit routed therethrough; said heat exchange fluid conduit in said first stage selective oxidizer being in contact with said selective oxidation catalyst in said first stage selective oxidizer bed.

9. The compact integrated fuel cell stack and selective oxidizer assembly of claim 7, wherein said selective oxidation catalyst is catalyzed open cell foam.

10. The compact integrated fuel cell stack and selective oxidizer assembly of claim 7, wherein said selective oxidation catalyst is catalyzed heat exchanger fins.

11. The compact integrated fuel cell stack and selective oxidizer assembly of claim 8, wherein said selective oxidation catalyst is catalyzed open cell foam.

12. The compact integrated fuel cell stack and selective oxidizer assembly of claim 8, wherein said selective oxidation catalyst is catalyzed heat exchanger fins.

13. The compact integrated fuel cell stack and selective oxidizer assembly of claim 6, wherein said heat exchange conduit in said internal selective oxidizer bed includes a plurality of tubes; said tubes connected to a coolant source for receiving coolant therethrough; wherein said tubes that are closest to said output plenum are the coldest tubes.

14. A compact integrated fuel cell stack and selective oxidizer assembly, comprising:

a fuel cell stack assembly;

a fuel inlet manifold adjacent to and in fluid communication with said fuel cell stack assembly;

a first selective oxidizer bed, having an input plenum and an output plenum; said first selective oxidizer bed residing in said fuel inlet manifold; said first selective oxidizer bed including a selective oxidation catalyst with a heat exchange fluid conduit routed therethrough; said heat exchange fluid conduit being in contact with said selective oxidation catalyst;

a second selective oxidizer bed, having an input plenum and an output plenum; said second selective oxidizer bed residing in said fuel inlet manifold; said output plenum of said second selective oxidizer bed being connected to said fuel cell stack assembly; said output plenum of said first selective oxidizer being connected to said input plenum of said second selective oxidizer bed; said second selective oxidizer bed including a selective oxidation catalyst with a heat exchange fluid conduit routed therethrough; said heat exchange fluid conduit being in contact with said selective oxidation catalyst; said heat exchange fluid conduit of said first selective oxidizer being in communication with said heat exchange fluid conduit of said second selective oxidizer;

a fuel source connected to said fuel inlet manifold, said fuel source being capable of providing fuel into said first internal selective oxidizer bed;

an oxidant source connected to said input plenum of said first internal selective oxidizer bed; said oxidant source being capable of providing oxygen into said first internal selective oxidizer bed via said input plenum;

temperature control means provided in said first selective oxidizer bed and connected to said heat exchange fluid conduit in said first selective oxidizer bed for controlling the temperature of said first selective oxidizer bed; and temperature control means provided in said second selective oxidizer bed and connected to said heat exchange fluid conduit in said second selective oxidizer bed for controlling the temperature of said second selective oxidizer bed.

15. The compact integrated fuel cell stack and selective oxidizer assembly of claim 14, wherein said selective oxidation catalyst in said first selective oxidizer bed and second selective oxidizer bed is catalyzed open cell foam.

16. The compact integrated fuel cell stack and selective oxidizer assembly of claim 14, wherein said selective oxidation catalyst in said first selective oxidizer bed and second selective oxidizer bed is heat exchanger fins.

* * * * *